(12) United States Patent
Zhang et al.

(10) Patent No.: US 11,236,662 B2
(45) Date of Patent: Feb. 1, 2022

(54) SYSTEMS FOR A PRE-CHAMBER

(71) Applicant: Ford Global Technologies, LLC, Dearborn, MI (US)

(72) Inventors: Xiaogang Zhang, Novi, MI (US); James Yi, West Bloomfield, MI (US); Steven Wooldridge, Manchester, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/918,680

(22) Filed: Jul. 1, 2020

(65) Prior Publication Data

US 2022/0003146 A1  Jan. 6, 2022

(51) Int. Cl.
  *F02B 19/10* (2006.01)
  *F02B 19/18* (2006.01)
  *F02B 19/12* (2006.01)

(52) U.S. Cl.
  CPC ........ *F02B 19/108* (2013.01); *F02B 19/1014* (2013.01); *F02B 19/12* (2013.01); *F02B 19/18* (2013.01)

(58) Field of Classification Search
  CPC ........ F02B 19/108; F02B 19/18; F02B 19/12; F02B 19/1014
  See application file for complete search history.

(56) References Cited

U.S. PATENT DOCUMENTS

| 3,270,722 | A | * | 9/1966 | Bernard | F02B 19/12 123/255 |
| 5,080,060 | A | * | 1/1992 | Huang | F02M 69/08 123/275 |
| 5,085,189 | A | * | 2/1992 | Huang | F02M 69/10 123/275 |
| 8,925,518 | B1 | * | 1/2015 | Riley | F02B 19/1057 123/261 |
| 9,353,674 | B2 | | 5/2016 | Bunce et al. | |
| 10,018,104 | B2 | | 7/2018 | Grover, Jr. et al. | |
| 2012/0103302 | A1 | | 5/2012 | Attard | |
| 2012/0118262 | A1 | * | 5/2012 | Johnson | F02B 19/00 123/260 |
| 2018/0363539 | A1 | * | 12/2018 | Shelby | F02B 19/108 |
| 2020/0200068 | A1 | * | 6/2020 | Schock | F02B 21/02 |

* cited by examiner

*Primary Examiner* — Xiao En Mo
(74) *Attorney, Agent, or Firm* — Geoffrey Brumbaugh; McCoy Russell LLP (57) ABSTRACT

Systems are provided for a pre-chamber. In one example, a pre-chamber comprises a passage outside of a primary combustion chamber for flowing fuel directly from a fuel injector to an interior volume of the pre-chamber.

12 Claims, 7 Drawing Sheets

SYSTEMS FOR A PRE-CHAMBER

FIELD

The present description relates generally to a hybrid pre-chamber.

BACKGROUND/SUMMARY

Engines may utilize pre-chamber combustion to increase combustion efficiency and correspondingly reduce emissions. Pre-chamber combustion systems may include an auxiliary pre-chamber above the main combustion chamber with an ignition device and fuel injector coupled to the auxiliary pre-chamber. In such systems, combustion unfolds in the following sequence; (i) a small amount of fuel is directly injected into the pre-chamber, (ii) spark is provided to the air/fuel mixture in the pre-chamber; and (iii) the hot gas jets into the main combustion chamber to ignite the charge disposed therein. Jetting the ignited gas into the main combustion chamber in this manner enables hot gas jets to penetrate deeper into the main combustion chamber, causing more evenly distributed ignition, when compared to engines that do not employ pre-chamber schemes.

One example approach shown by Attard in U.S. 2012/0103302 includes a system with an ignition assembly with a pre-chamber, a fuel injector, and a spark plug that is mounted in the cylinder head above the main combustion chamber. Attard's pre-chamber ignition system achieves fast burn in fuel-lean conditions. However, the inventors have recognized several potential drawbacks with Attard's system and other pre-chamber assemblies. For instance, residual burned gases may dwell in the pre-chamber, diluting the air/fuel mixture in subsequent combustion cycles. As a result, combustion efficiency is decreased and emissions are associatively increased. Moreover, the supplemental fuel injected into the pre-chamber may not enhance ignitibility or burn rate during stoichiometric conditions. Therefore, Attard's system may only achieve efficiency gains during a limited window of engine operation.

The inventors have identified the above described issues and developed a way to at least partially solve them. In one example, the issues described above may be addressed by a system comprising a pre-chamber fluidly coupled to a primary combustion chamber, the pre-chamber comprising a connecting passage fluidly coupling a fuel injector to the pre-chamber in an area outside of the primary combustion chamber. In this way, a packaging size of the pre-chamber may be reduced as a well as reducing demand for a second fuel injector.

As one example, the pre-chamber may comprise one or more features for flowing intake air and fuel to an interior volume of the pre-chamber. In one example, the one or more features may be arranged outside of a primary combustion chamber, so that air and fuel directly flow to the interior volume of the pre-chamber without entering the primary combustion chamber. Additionally or alternatively, the one or more features may be arranged within a volume of the primary combustion chamber, wherein a surface of a piston may be modified to promote air, fuel, and mixtures thereof into the pre-chamber. By utilizing one or more of these examples, only one fuel injector may be positioned to provide fuel to each of the pre-chamber and the primary combustion chamber which may result in a reduced packaging size and manufacturing costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
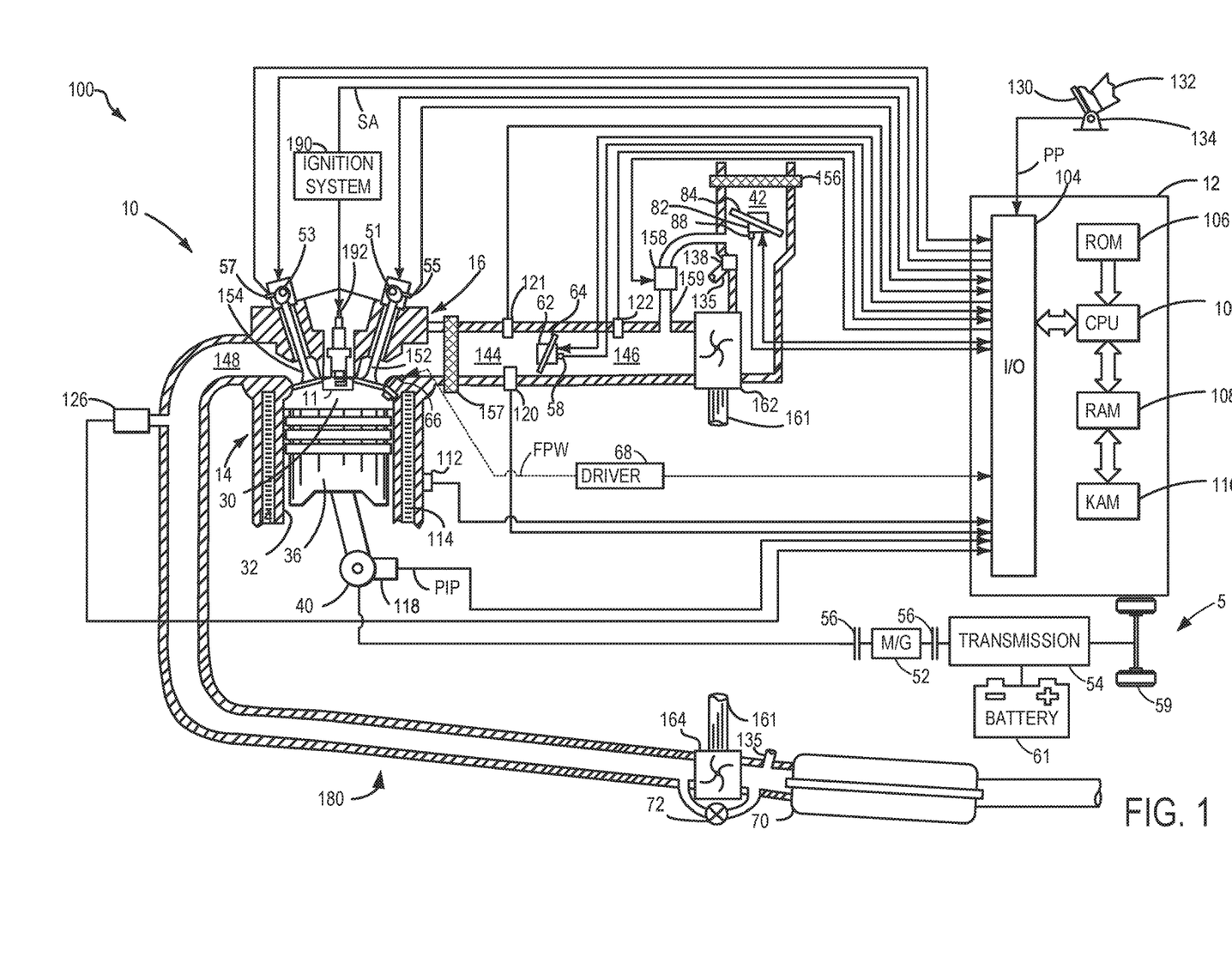
FIG. 1 illustrates an engine of a hybrid vehicle.
Figure 2:
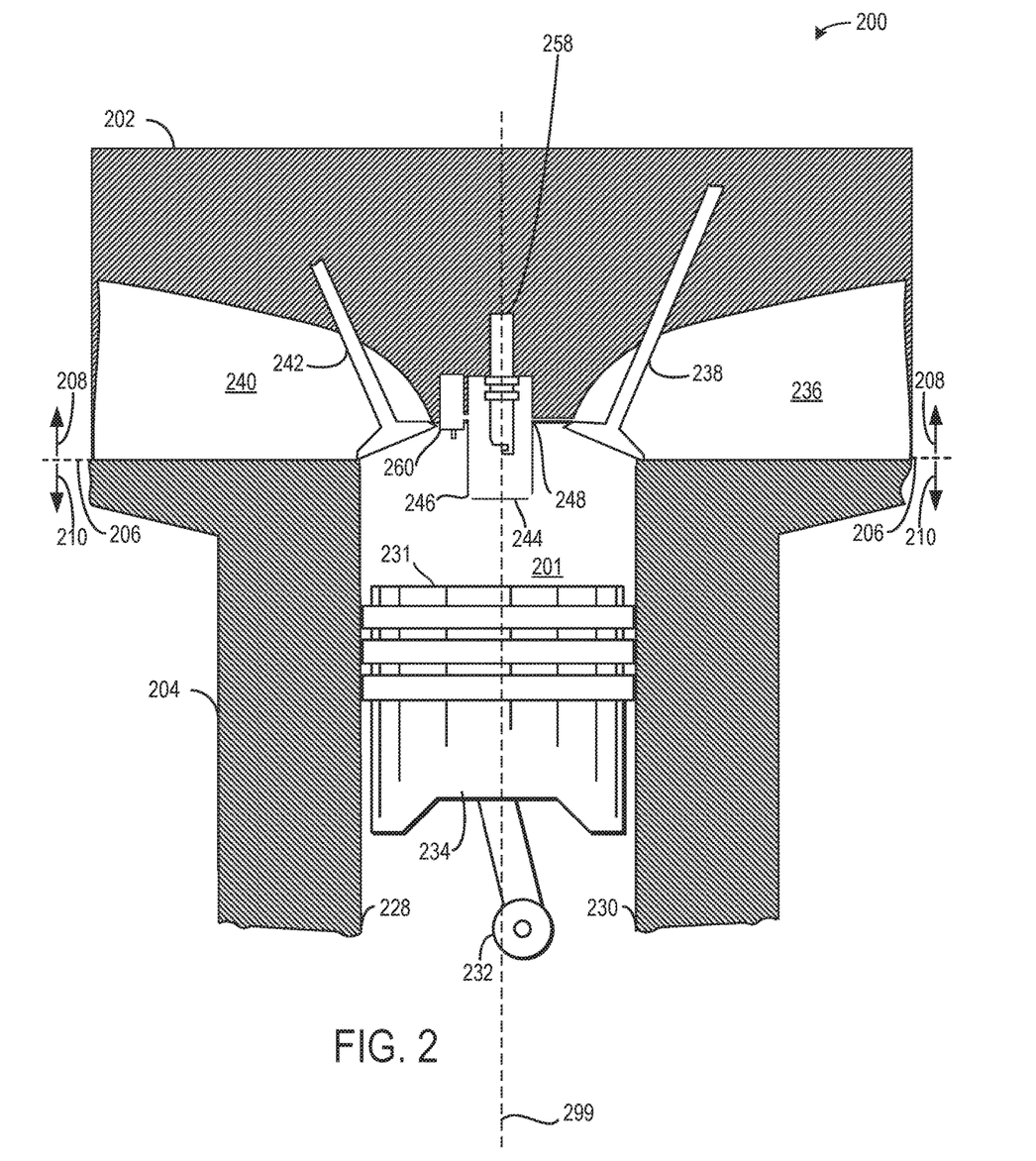
FIG. 2 illustrates a pre-chamber of the engine.

The following description relates to a pre-chamber. In one example, the pre-chamber is arranged in a primary combustion chamber of an engine, as illustrated in FIG. 1. In one example, the engine is an engine of a hybrid vehicle. In one example, the pre-chamber may be a hybrid pre-chamber comprising only an ignition device such that a fuel injector is arranged outside of the pre-chamber and positioned to inject directly into a primary combustion chamber, as illustrated in FIG. 2. The pre-chamber may comprise one or more features for receiving a portion of a fuel injection directly from the fuel injector along with receiving an amount of intake air from an intake passage during a combustion cycle. An example of such a pre-chamber is illustrated in FIGS. 3A, 3B, 3C, and 3D. The pre-chamber in FIGS. 3A-3D comprises an air passage for directly routing a portion of air from an intake passage to an interior volume of the pre-chamber. The pre-chamber further comprises a connecting passage configured to directly route a portion of fuel from the fuel injector to the interior volume of the pre-chamber without flowing the fuel to the primary combustion chamber. Various shapes of the connecting passage are illustrated in FIGS. 4A, 4B, 4C, 4D, 4E, and 4F. In this way, the pre-chamber may be a hybrid pre-chamber with the air passage and the connecting passage arranged outside of the primary combustion chamber and configured to direct air and fuel directly to the pre-chamber prior to flowing the air and fuel to the primary combustion chamber.

A second example of the pre-chamber is illustrated in FIGS. 5A, 5B, 5C, 5D, and 5E. In one example, the shape of the second example of the pre-chamber may be similar to the shape of the first example illustrated in FIGS. 3A-3D, however, the second example may differ in a positioning of the pre-chamber along with a surface shape of a piston. The second example of the pre-chamber may comprise upper and lower openings for receiving intake gases and fuel from a recess of the piston and an area between the piston and a fire deck.

In the embodiments below of the pre-chamber, features may be introduced to assist in the expulsion of residual gases from a volume of the pre-chamber to a volume of the primary combustion chamber during a current combustion event. Herein, residual gases refer to gases from a previous combustion cycle that were not expelled and may be held within the pre-chamber. As such, the residual gases may include air, exhaust gas, unburned hydrocarbons, and combustion byproducts. Furthermore, a combustion cycle includes an intake stroke, a compression stroke, an expansion stroke, and an exhaust stroke. A current combustion cycle ends and a next combustion cycle begins on a transition of a piston from the exhaust stroke to an intake stroke.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

In one example, the combustion chamber 30 is a primary combustion chamber further comprising a pre-chamber 11. The spark plug 192 may be arranged to ignite an air/fuel mixture arranged within only the pre-chamber 11. A positioning of the spark plug 192, the injector 66, and the pre-chamber 11 may be adjusted as described below.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, fuel injection and spark timing may be adjusted Turning now to FIG. 2, it shows an example of a single cylinder of an engine 200. In one example, the engine 200 may be a non-limiting example of the engine 10 of FIG. 1.

As such, the engine 200 may be included within the embodiment of a hybrid vehicle, such as vehicle 6 of FIG. 1. In this way, a pre-chamber 244 may be a non-limiting example of the pre-chamber 11 of FIG. 1.

The engine 200 comprises a primary combustion chamber 201. The primary combustion chamber 201 may be a non-limiting example of the combustion chamber 30 of FIG. 1. The primary combustion chamber 201 may be defined via a cylinder head 202, a first interior cylinder wall 228, a second interior cylinder wall 230, and a piston surface 231. It will be appreciated that the first interior cylinder wall 228 and the second interior cylinder wall 230 may be a single, continuous wall. However, in the example of FIG. 2, the cross-section divides the walls into two pieces. In this way, a primary combustion chamber volume may be defined by a cylinder head 202, the first interior cylinder wall 228, the second interior cylinder wall 230, and the piston surface 231. The primary combustion chamber volume may be adjusted via oscillation of the piston 234.

The piston surface 231 corresponds to an upper surface of the piston 234, wherein the piston 234 may be configured to oscillate within the primary combustion chamber 201 via a crankshaft 232. The crankshaft may rotate as a fuel air mixture within the primary combustion chamber 201 combusts and presses against the piston surface 231 and pushes the piston 234 downward. This action may result in motion of the vehicle.

To enhance combustion properties, such as combustion distribution, the pre-chamber 244 is fluidly coupled to the primary combustion chamber 201 via a plurality of passages including a plurality of lower openings 246. The pre-chamber 244 may comprise a cylindrical shape defined by a protection tube or other component with surfaces that define an interior volume of the pre-chamber 244 separately from an interior volume of the primary combustion chamber 201. The plurality of lower openings 246 may be machined through a surface of protection tube.

The pre-chamber 244 further comprises a plurality of upper openings 248 arranged above the plurality of lower openings 246 in the cylinder head 202. The plurality of upper openings 248 interact with air introduction and fuel introduction systems arranged in the cylinder head 202. That is to say, the air introduction system fluidly couples the pre-chamber directly to an intake passage 236 and the fuel introduction system fluidly couples the pre-chamber directly to the fuel injector 260. In this way, the air introduction and fuel introduction systems may allow the pre-chamber 244 to receive air and fuel in an area outside of the primary combustion chamber 201 in a portion of the cylinder head 202 near a fire deck. Herein, the fire deck is a surface of the cylinder head 202 in direct contact with the interior volume of the primary combustion chamber 201.

The pre-chamber 244 further comprises an ignition device 258 arranged along a central axis 299 of the pre-chamber 244. In one example, the central axis 299 is also a central axis of the primary combustion chamber 201, wherein the piston 231 oscillates along the central axis 299 to adjust a volume of the primary combustion chamber 201 without adjusting a volume of the pre-chamber 244. In one example, the plurality of lower openings 246 and the plurality of upper openings 248 are equidistant from the central axis 299.

In one example, the primary combustion chamber 201 is free of an ignition device, but comprises its own fuel injector such as fuel injector 66 of FIG. 1 or fuel injector 260. Additionally or alternatively, the primary combustion chamber 201 may be configured to receive a port injection, wherein a fuel injector is arranged in an intake port upstream of the intake valve 238. In one example, the primary combustion chamber 201 may comprise a port injector and a direct injector. Fuel injector 260 is merely one example positioning of a fuel injector positioned to inject directly into the primary combustion chamber 201. As illustrated, the fuel injector 260 is directly adjacent to the pre-chamber 244 while being positioned to inject into a portion of the primary combustion chamber 201 adjacent to the pre-chamber 244. In this way, the pre-chamber 244 may house a portion of the ignition device 258 such that the ignition device 258 provides a spark to an interior volume of the pre-chamber 244 while the primary combustion chamber 201 is configured to directly receive an injection from the fuel injector 260. As such, the pre-chamber 244 is a passive pre-chamber in the example of FIG. 2.

The primary combustion chamber 201 may receive air flow from an air intake passage 236 when an intake valve 238 is in an open position. The pre-chamber 244 may receive air from the primary combustion chamber 201 via one or more of the plurality of air paths 248 and the wire mesh 250. The primary combustion chamber 201 may be fluidly coupled to an exhaust passage 240 when an exhaust valve 242 is in an open position. Exhaust gases along with other combustion artifacts (e.g., air, unburned fuel, etc.) may be expelled to the exhaust passage 240 from the primary combustion chamber 201. When the intake valve 238 and the exhaust valve 242 are in closed positions, such as the positions illustrated, the primary combustion chamber 201, and the pre-chamber 244 may be fluidly sealed from the intake passage 236 and the exhaust passage 240.

In this way, the primary combustion chamber 201 is a separate volume of space relative to the pre-chamber 244, wherein a volume of the primary combustion chamber 201 is greater than a volume of the pre-chamber 244. The pre-chamber 244 may receive intake gases from the primary combustion chamber 201 and release an at least partially ignited fuel/air mixture to the primary combustion chamber 201 to initiate combustion within the primary combustion chamber 201.

As illustrated, the pre-chamber 244 is arranged within a volume of the primary combustion chamber 201. More specifically, dashed line 206 illustrates a divide between the cylinder head 202 and the cylinder block 204. Arrow 208 illustrates a cylinder head side and arrow 210 illustrates a cylinder block side. The ignition device 258 extends from the cylinder head side and into the volume of the pre-chamber 244 on the cylinder block side. The pre-chamber 244 is arranged in a position to receive an extreme end of the ignition device 258 such that it sparks within a volume of the pre-chamber 244. In one example, an entire volume of the pre-chamber 244 is arranged on the cylinder block side of the engine 201. However, the volume of the pre-chamber 244 is fixed and separated from the volume of the primary combustion chamber 201 such that oscillation of the piston 234 does not result in a change in volume of the pre-chamber 244.

Figure 3A:
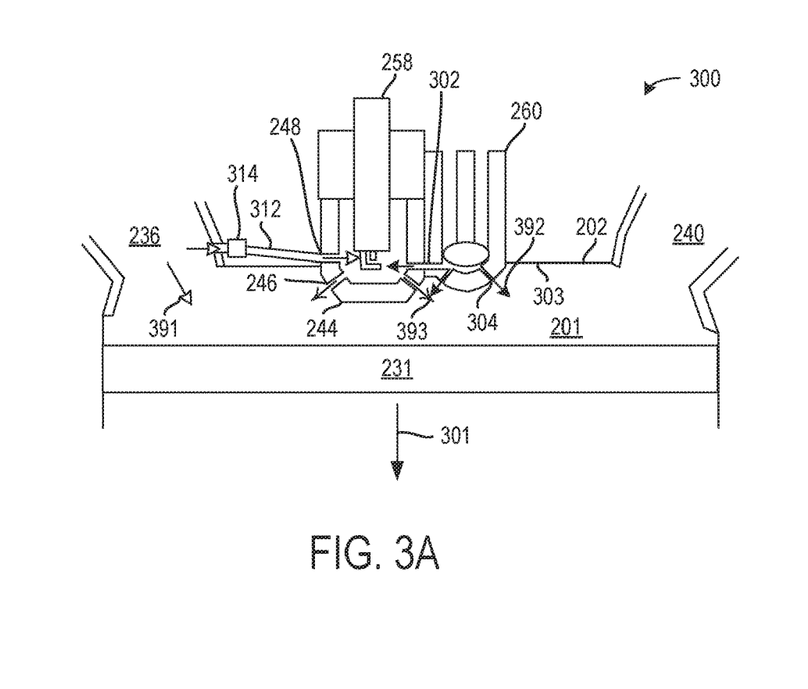
FIGS. 3A, 3B, 3C, and 3D illustrate gas flow in and out of the pre-chamber during a combustion cycle.
Figure 3B:
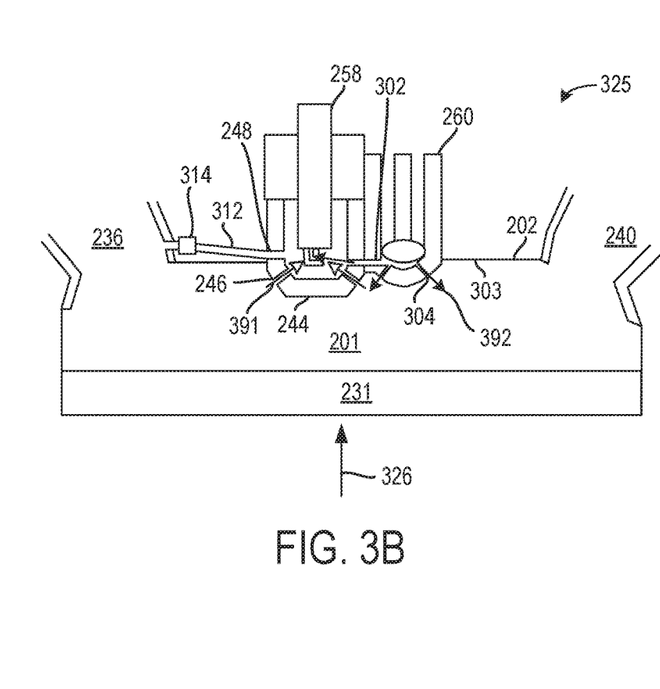
Figure 3C:
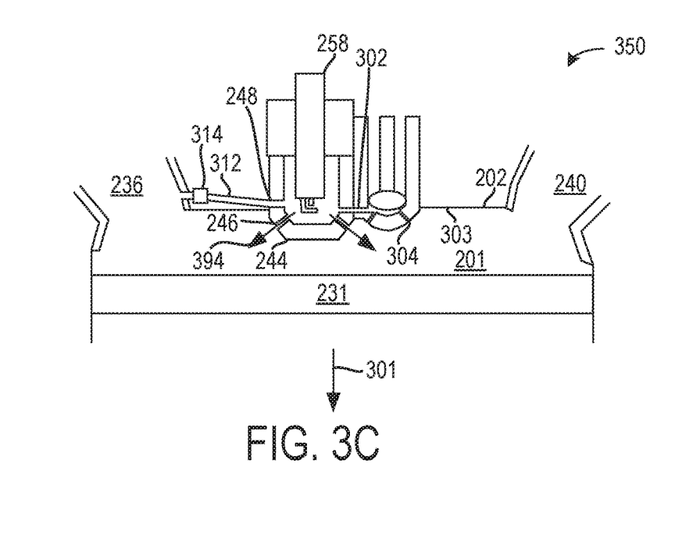
Figure 3D:
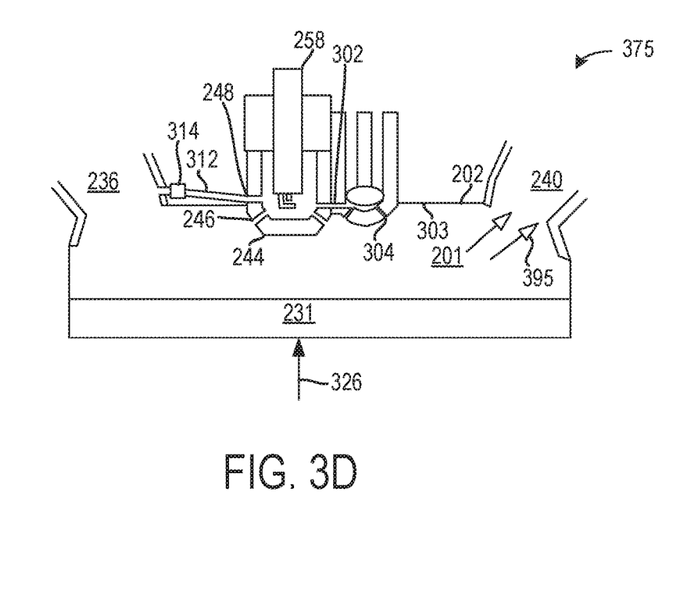

Turning now to FIGS. 3A, 3B, 3C, and 3D, they illustrate a first embodiment of the primary combustion chamber 201 and the pre-chamber 244. FIG. 3A illustrates an intake stroke 300 of the first embodiment. FIG. 3B illustrates a compression stroke 325 of the first embodiment. FIG. 3C illustrates an expansion stroke 350 of the first embodiment. FIG. 3D illustrates an exhaust stroke 375 of the first embodiment.

The first embodiment illustrates the pre-chamber 244 which is configured as a hybrid pre-chamber. In the example of the present disclosure, the hybrid pre-chamber houses only the ignition device 258. The pre-chamber 244 comprises a first passage 302, which is herein referred to as a connecting passage 302, directly coupling an interior volume of the pre-chamber 244 to an interior volume of the fuel injector 260. In this way, the connecting passage 302 may function similarly to a nozzle outlet 304, wherein the fuel from the interior of the fuel injector 260 is ejected through the nozzle outlet 304 or the connecting passage 302 and into the primary combustion chamber volume 201 or the interior volume of the pre-chamber 244, respectively.

The pre-chamber 244 further comprises a second passage 312, which is herein referred to as an air passage 312. The air passage 312 may be configured to flow intake air directly from the intake port 236 to the interior volume of the pre-chamber 244. The air passage 312 further comprises a valve 314 configured to control an amount of intake air flowing through the air passage 312 to the pre-chamber 244. A position of the valve 314 may be based on a pressure of one or more of the intake port 236 and the pre-chamber 244, wherein the pressure of the pre-chamber 244 may be based on a primary combustion chamber pressure, a fuel injection pressure, and the like. In one example, the valve 314 is a check valve. In some examples, the valve 314 may be omitted and the intake air valve, such as intake air valve 238 of FIG. 2 may be shaped to control air flow to both the primary combustion chamber 201 and the air passage 312.

In this way, the pre-chamber 244 is configured to directly receive fuel via the connecting passage 302 and air via the air passage 312. Each of the connecting passage 302 and the air passage 302 are arranged outside of the primary combustion chamber 201 above a fire deck 303 in the cylinder head 202. A direction of fuel flow through the connecting passage 302 may be in a direction opposite to a direction of air flow through the air passage 312. The pre-chamber 244 may receive air and/or fuel at various stages of the combustion cycle, as will be described herein. As illustrated, the connecting passage 302 and the air passage 312 are fluidly coupled to the pre-chamber 244 via the plurality of upper openings 248. As such, air in the air passage 312 and fuel in the connecting passage 302 do not flow through the plurality of lower openings 246.

Referring specifically to FIG. 3A, an intake stroke 300 of the combustion cycle is illustrated. The piston 231 moves from a top-dead center position (TDC) to a bottom-dead center position (BDC) in a first direction 301 away from the cylinder head 202. As the piston moves in the first direction 301, intake air 391 may enter the primary combustion chamber 201 via the intake passage 236. The valve 314 may be moved to an open position due to a pressure difference between the intake passage and an interior volume of the pre-chamber 244. As such, intake air from the intake passage 236 flows through the valve 314, which is in an open position, and directly into the pre-chamber 244. As such, both the primary combustion chamber 201 and the pre-chamber 244 may be at least partially filled with intake air 391.

During a portion of the intake stroke, such as near an end of the intake stroke as the piston 231 approaches BDC, a fuel injection 392 may be expelled from the fuel injector 260 into the primary combustion chamber 201 via a plurality of nozzle openings 304. The fuel injection 392 may further flow directly through the connecting passage 302 and into the interior volume of the pre-chamber 244. In this way, fuel and air may mix within the interior volume of the pre-chamber 244 and flow through outlets 246 of the pre-chamber 244. That is to say, residual gases 393 may exit the pre-chamber 244 and mix with intake air 391 and the fuel injection 392 in the primary combustion chamber 201 during the intake stroke.

Proceeding to FIG. 3B, it shows an embodiment of a compression stroke 325 of the combustion cycle. The piston 231 moves from BDC to TDC in a second direction 326, opposite to the first direction 301 of FIG. 3A. During the compression stroke, fuel injections 392 may continue to occur. As such, fuel may exit the fuel injector 260 via the plurality of nozzle openings 304 and flow into the primary combustion chamber 201. The fuel injector 260 may also direct a portion of its fuel injection into the interior volume of the pre-chamber 244 via the connecting passage 302. The interior volume of the pre-chamber 244 may further receive gases situated near TDC of the primary combustion chamber 201. In the example illustrated in FIG. 3B, the gases situated neat TDC include intake air 391. However, it will be appreciated that the gases may further includes fuel vapors and/or an air/fuel mixture. In this way, fuel and air may continue to mix within the interior volume of the pre-chamber 244 during the compression stroke.

Proceeding to FIG. 3C, which illustrates an embodiment of an expansion stroke 350 (e.g., a power stroke) of the combustion cycle. The expansion stroke includes moving the piston 231 in the first direction 301 from TDC to BDC. Slightly before or at the start of the expansion stroke, the ignition device 258 may provide a spark within the interior volume of the pre-chamber 244, wherein the air/fuel mixture therein is ignited and ejected into the primary combustion chamber 201. In one example, slightly before the expansion stroke may include where the piston 231 is within a threshold range of TDC during the compression stroke. In one example, the threshold range is within 25% or less of TDC. The combusted mixture and/or the flame front is illustrated via arrows 394. The flame front may travel deep into the volume of the primary combustion chamber 201 to more evenly distribute the flame front through the primary combustion chamber 201. As shown, the combusted mixture 394 exits the pre-chamber 244 via only the lower openings 246.

The nozzle outlets 304 and the lower openings 246 may be shaped to avoid interactions between gases and/or liquids being expelled therefrom. As such, sprays may not impinge onto a bottom of the pre-chamber 244 or the fuel injector 260.

Proceeding to FIG. 3D, which illustrates an embodiment of an exhaust stroke 375 of the combustion cycle. The exhaust stroke includes moving the piston 231 in the second direction 326 from BDC to TDC. As the piston 231 moves in the second direction 326, exhaust gases 395 are pushed out of the primary combustion chamber 201 and into the exhaust passage 240.

Figure 4A:
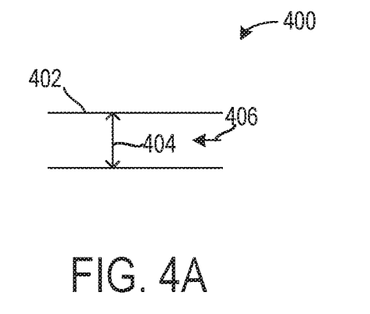
FIGS. 4A, 4B, 4C, 4D, 4E, and 4F illustrate various shapes of a connecting passage fluidly coupling the pre-chamber to a fuel injector.

Turning now to FIG. 4A, it shows a first example shape 400 of a connecting passage 402, which may be a non-limiting example of the connecting passage 302 of FIGS. 3A-3D. The connecting passage 402 comprises a uniform cross-sectional flow through area 404 taken along an axis perpendicular to a fuel injection flow direction from a fuel injector to the interior volume of the pre-chamber illustrated via arrow 406. As such, the connecting passage 402 comprises a rectangular cross-section taken along the fuel injection flow direction. In one example, the connecting passage 402 is a straight hole nozzle wherein its diameter (e.g., the cross-sectional flow through area 404) is equal to 0.05 mm and its length is equal to 2.0 mm.

Figure 4B:
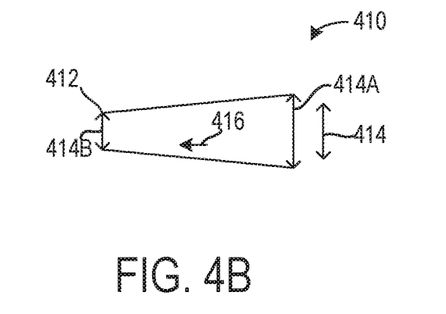

Turning now to FIG. 4B, it shows a second example shape 410 of a connecting passage 412, which may be a non-limiting example of the connecting passage 302 of FIGS.

3A-3D. The connecting passage 412 comprises a non-uniform cross-sectional flow through area 414 taken along an axis perpendicular to a fuel injection flow direction from a fuel injector to the interior volume of the pre-chamber illustrated via arrow 416. In one example, the cross-sectional flow through area 414 decreases in the direction of the fuel injection flow direction such that the connecting passage 412 is narrowest proximal to the pre-chamber. In one example, the connecting passage 412 is a forward cone nozzle comprising an inlet diameter 414A equal to 0.1 mm and an outlet diameter 414B equal to 0.05 mm and a length equal to 2.0 mm.

Figure 4C:
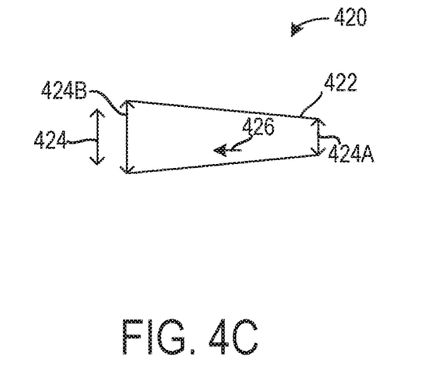

Turning now to FIG. 4C, it shows a third example shape 420 of a connecting passage 422, which may be a non-limiting example of the connecting passage 302 of FIGS. 3A-3D. The connecting passage 422 comprises a non-uniform cross-sectional flow through area 424 taken along an axis perpendicular to a fuel injection flow direction from a fuel injector to the interior volume of the pre-chamber illustrated via arrow 426. In one example, the cross-sectional flow through area 424 increases in the direction of the fuel injection flow direction such that the connecting passage 422 is widest proximal to the pre-chamber. In one example, the connecting passage 422 is a backward cone nozzle comprising an inlet diameter 424A equal to 0.05 mm and an outlet diameter 414B equal to 0.1 mm and a length equal to 2.0 mm.

Figure 4D:
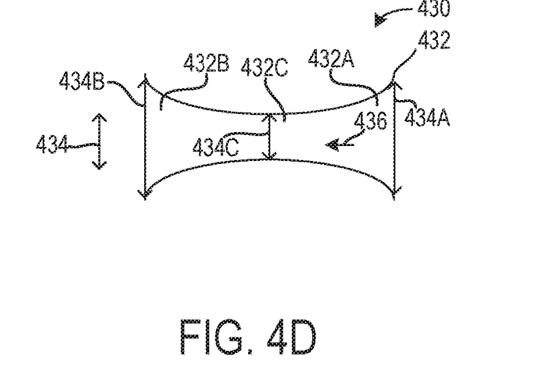

Turning now to FIG. 4D, it shows a fourth example shape 430 of a connecting passage 432, which may be a non-limiting example of the connecting passage 302 of FIGS. 3A-3D. The connecting passage 432 comprises a non-uniform cross-sectional flow through area 434 taken along an axis perpendicular to a fuel injection flow direction from a fuel injector to the interior volume of the pre-chamber illustrated via arrow 436. In one example, the cross-sectional flow through area 434 decreases toward a center portion of the connecting passage 432 from the fuel injector and then begins to increase from the center portion to the pre-chamber. In one example, the connecting passage 432 is a venturi passage comprising a symmetric shape, wherein the connecting passage 432 is widest proximal to the pre-chamber and the fuel injector and narrowest at its center. Said another way, the connecting passage 432 comprises a venturi inlet 432A adjacent to the fuel injector, a venturi outlet 432B adjacent to the pre-chamber, and a venturi throat 432C between the venturi inlet 432A and the venturi inlet 432B. In one example, the connecting passage 432 is a symmetric venturi passage comprising an inlet diameter 434A equal to 0.12 mm, an outlet diameter equal to 0.12 mm, a throat diameter equal to 0.05 mm, and a length equal to 2.0 mm.

Although not illustrated, the venturi throat 432C of the connecting passage 432 may be connected to another passage, such as the air passage 312. In this way, fuel and air may mix directly within the connecting passage 432.

Figure 4E:
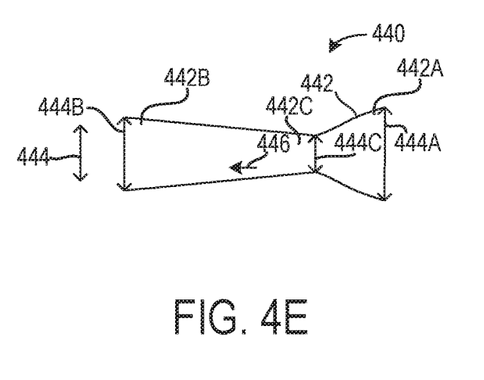

Turning now to FIG. 4E, it shows a fifth example shape 440 of a connecting passage 442, which may be a non-limiting example of the connecting passage 302 of FIGS. 3A-3D. The connecting passage 442 comprises a non-uniform cross-sectional flow through area 444 taken along an axis perpendicular to a fuel injection flow direction from a fuel injector to the interior volume of the pre-chamber illustrated via arrow 446. In one example, the connecting passage 442 comprises a biased venturi shape, wherein a venturi throat 442C is closer to the venturi inlet 442A than the venturi outlet 442B. As such, the cross-sectional flow through area 444 may decrease at a greater rate through the venturi inlet 442A than its rate of increase from the venturi throat 442C to the venturi outlet 442B. In one example, the connecting passage 442 is an asymmetric forward venturi passage with an inlet diameter 444A and an outlet diameter 444B equal to 0.12 mm and a throat diameter 444C equal to 0.05, wherein the throat 442C is proximal to the inlet 442A. A length of the connecting passage 442 is equal to 2.0 mm.

Figure 4F:
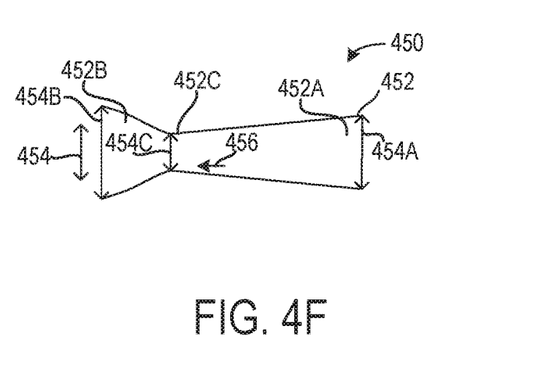

Turning now to FIG. 4F, it shows a fifth example shape 450 of a connecting passage 452, which may be a non-limiting example of the connecting passage 302 of FIGS. 3A-3D. The connecting passage 452 comprises a non-uniform cross-sectional flow through area 454 taken along an axis perpendicular to a fuel injection flow direction from a fuel injector to the interior volume of the pre-chamber illustrated via arrow 456. In one example, the connecting passage 452 comprises a biased venturi shape, wherein a venturi throat 452C is closer to the venturi outlet 442B than the venturi inlet 442A. As such, the cross-sectional flow through area 454 decreases at a first rate from the venturi inlet 452A to the venturi throat 452C and increases at a second rate from the venturi throat 452C to the venturi outlet 452B, wherein the first rate is less than the second rate. In one example, the connecting passage 452 is an asymmetric backward venturi passage with an inlet diameter 454A and an outlet diameter 454 equal to 0.12 mm and a throat diameter 454C equal to 0.05, wherein the throat 452C is proximal to the inlet 452A. A length of the connecting passage 452 is equal to 2.0 mm.

In one example, the pre-chamber may demand less fuel than the primary combustion chamber such that a diameter of the connecting passage is less than a diameter of nozzle outlets of the fuel injector. That is to say, less fuel may flow through the connecting passage compared to the nozzle outlets which direct fuel to the primary combustion chamber. As such, one of the embodiments of FIGS. 4A through 4F may be selected based on a desired fuel flow characteristic of a particular engine environment.

Turning now to FIGS. 5A to 5E, they show embodiments of a primary combustion chamber 501 and a pre-chamber 512. In one example, the embodiments of FIGS. 5A-5E comprise a pre-chamber 512, which comprises a shape substantially identical to a shape of the pre-chamber 244. However, a positioning of the pre-chamber 512 may differ from the positioning of the pre-chamber 244 in that all openings of the pre-chamber 512 are arranged within the primary combustion chamber 501. In one example, the pre-chamber 244 may be used in the examples of FIGS. 5A through 5E without departing from the scope of the present disclosure.

A piston 531 may comprise a shape configured to promote intake air flow and fuel injection flow into the interior volume of the pre-chamber 512 similar to the intake air and fuel injection flows with regard to FIGS. 3A to 3D. More specifically, the piston 531 comprises a bisected octagon shape, wherein the piston 531 is symmetric and comprises first sides 541, second sides 542, and third sides 543. Between the third sides 543, there may be a pair of ramps 544 separated by a recess 545, wherein the recess is shaped to receive at least a portion of the pre-chamber 544 at TDC.

The first sides 541 may be adjacent to the second sides 542 and the combustion chamber walls. The first sides 541 may be angled at a first angle 541A relative to a central axis 599 about which the piston 531 may oscillate. The first angle 541A may be greater than 0 and less than 20 degrees. In one example, the angle 541A is between 5 and 15 degrees.

The second sides 542 may be between the first sides 41 and the third sides 543, wherein the second sides 542 may interface with an intake passage 536 and an exhaust passage 540. The second sides 542 may be angled at a second angle 542A relative to the central axis 599. The second angle 542A may be greater than the first angle 541A, wherein the second angle 542A is between 20 and 60 degrees. In one example, the second angle 542A is between 30 and 50 degrees. Additionally or alternatively, in some examples, the second angle 542A is between 35 and 45 degrees.

The third sides 543 may be between the second sides 542 and the ramps 544. The third sides 543 may be non-planar, whereas the first sides 541 and the second sides 542 comprise a planar shape. In one example, the third sides 543 may be non-planar to redirect fuel and intake air flow toward the pre-chamber 512. In one example, the third sides 543 are contoured, wherein the contour forms a slight depression protruding away from the cylinder head 504. In one example, an average angle and/or an overall angle of the third sides 542 may be substantially normal to the central axis 599.

The ramps 544 may be between the third sides 543 and the recess 545. The ramps 544 may be shaped to surround at least a portion of the pre-chamber 544 when the piston 531 is TDC. In one example, the ramps 544 extend toward upper openings 518 without covering the upper openings 518. As such, the upper openings 518 may remain fluidly coupled to the primary combustion chamber 501 through an entire range of motion of the piston 531. The ramps 544 may be angled to the central axis 599 by a third angle 544A. In one example, the third angle 544A is substantially equal to the second angle 542A. However, it will be appreciated that the third angle 544A may be less than or greater than the second angle 542A without departing from the scope of the present disclosure.

The recess 545 is between the ramps 544 and configured to receive a portion of the pre-chamber 512. In one example, the recess 545 is shaped such that there are gaps between surfaces of the recess 545 and the pre-chamber 512. In this way, the pre-chamber 512 may be fluidly coupled to the interior volume of the primary combustion chamber 501 even when the pre-chamber 512 is at least partially arranged within the recess 545.

As described above, the positioning of the pre-chamber 512 may differ from the positioning of the pre-chamber 244 of FIGS. 2-3D. All openings of the pre-chamber 512 are arranged within the primary combustion chamber 501 such that the pre-chamber 512 may not receive gases from an area outside of the primary combustion chamber 501, unlike the pre-chamber 244. More specifically, the upper openings 518 and a plurality of lower openings 514 fluidly couple the interior volume of the pre-chamber 512 to only the interior volume of the primary combustion chamber 501. Each of the lower openings 514 and the upper openings 518 may function as inlets or outlets depending on a piston position during a combustion cycle.

Figure 5A:
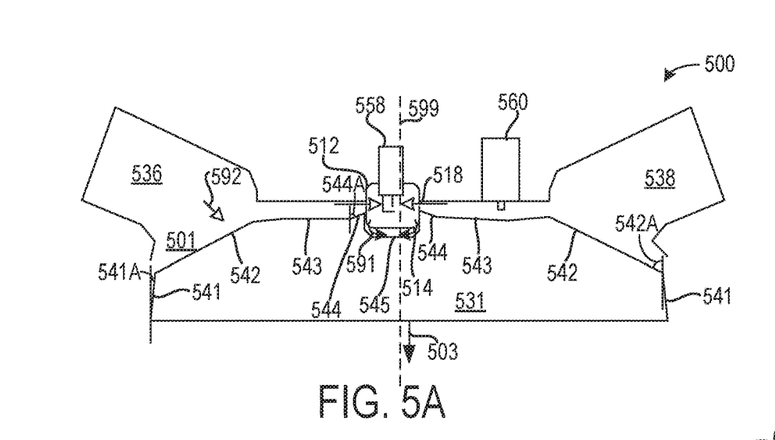
FIGS. 5A, 5B, 5C, 5D, and 5E illustrate a second embodiment of a pre-chamber.

Turning now to FIG. 5A, it shows an embodiment 500 of an early stage intake stroke for the primary combustion chamber 501. During the early intake stroke, which may occur when the piston 531 is moving in a first direction 503 and still within a threshold range of TDC (e.g., within 50% of TDC), a vacuum may be regenerated as the piston moves in the first direction 503. This vacuum may draw residual gases from out of the pre-chamber 512 as illustrated via residual gases 591 exiting the pre-chamber 512 via the lower openings 514. As the residual gases 591 exit the pre-chamber 512, intake gases 592 may fill the pre-chamber 512 by entering the interior volume of the pre-chamber 512 via the upper openings 518.

Figure 5B:
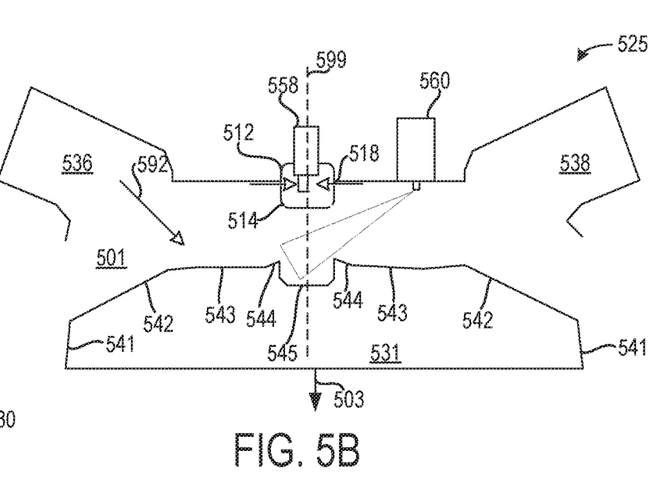

Turning now to FIG. 5B, it shows an embodiment 525 of a late stage intake stroke for the primary combustion chamber 501. During the late stage intake stroke, which occurs following the early stage intake stroke within a same movement of the piston from TDC to BDC, the fuel injector 560 injects fuel 593 into the primary combustion chamber 501. In one example, the shape of the third sides 593, the ramps 544, and the recess 545 may promote enhanced air and fuel mixing during the late stage intake stroke, where a portion of the air/fuel mixture fills the recess 545. Similar to the examples of FIGS. 3A to 3D, the fuel injector 560 is arranged between the pre-chamber 512 and the exhaust port 538.

Figure 5C:
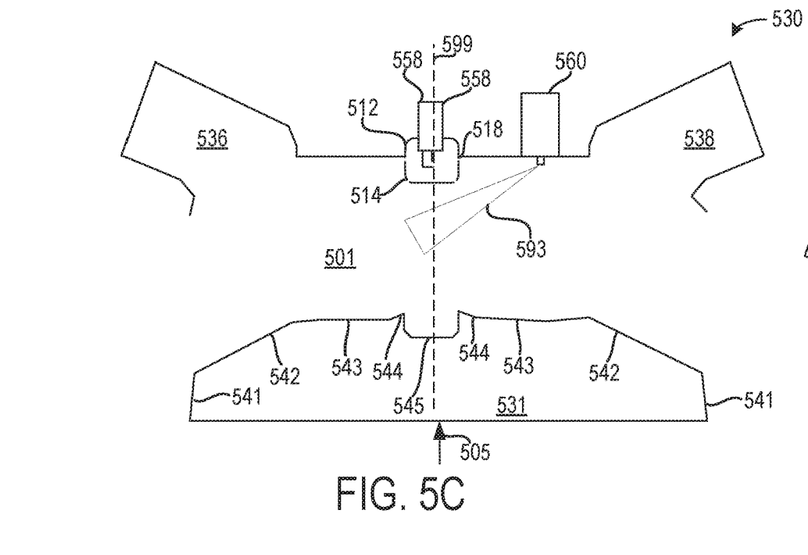

Turning now to FIG. 5C, it shows an embodiment 530 of an early stage of a compression stroke. In one example, the early stage of the compression stroke occurs following the late stage of the intake stroke and when the piston 531 is still closer to BDC than TDC. The piston 531 moves in the second direction opposite the first. The early stage of the compression stroke may be similar to the late stage of the intake stroke in that fuel 593 may still be injected into the primary combustion chamber 501.

Figure 5D:
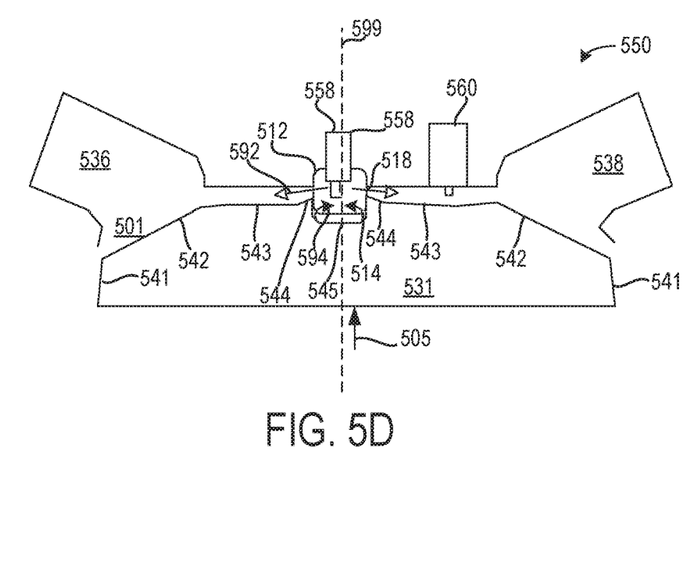

Turning now to FIG. 5D, it shows an embodiment 550 of a late stage of the compression stroke. In one example, the late stage of the compression stroke occurs as the piston 531 approaches TDC such that the piston 531 is closer to TDC than BDC. In the late stage of the compression stroke, the pre-chamber 512 is at least partially surrounded by surfaces of the recess 545. An air/fuel mixture 594 in the recess 545 may be forced into the interior volume of the pre-chamber 512 via the lower openings 514. As the air/fuel mixture 594 at least partially fills the pre-chamber 512, intake gases 592 may exit the pre-chamber 512 via the upper openings 518.

Figure 5E:
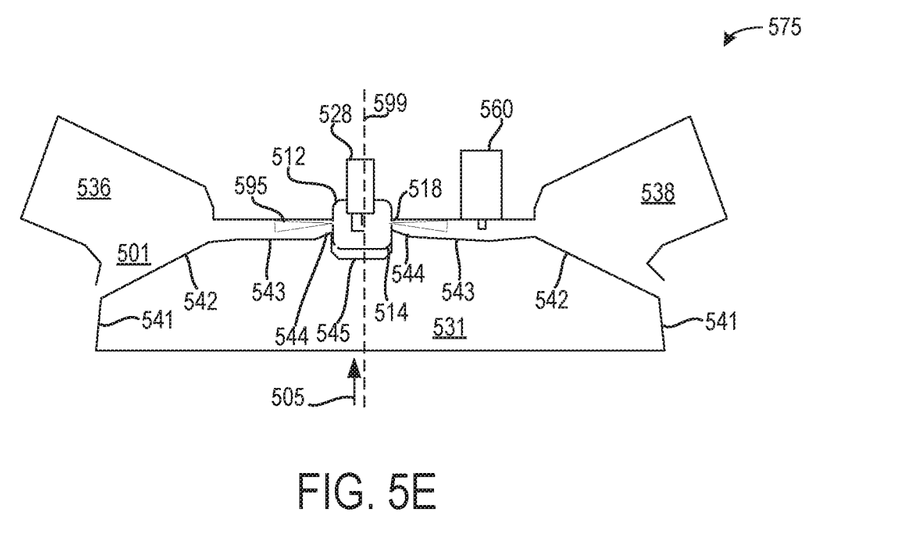

Turning now to FIG. 5E, it shows an embodiment 575 of the piston 531 at TDC between the compression stroke and an expansion stroke wherein the ignition device 528 is activated. As such, combustion ignition occurs in the pre-chamber 512 first and the combusted gases 595 exit the pre-chamber 512 via the upper openings 518.

As the piston moves down during the expansion stroke, the combusted gases 595 may be sucked down and penetrate an entire volume of the primary combustion chamber 501 to evenly distribute a flame front. During the example stroke, exhaust gases formed via combustion of the combusted gases 595 may be pushed out of the primary combustion chamber 501 via the exhaust passage 538 prior to a start of a subsequent combustion cycle.

In one example, the piston 531 may be utilized in the embodiments of FIGS. 3A through 3D. In this way, the pre-chamber 244 comprising the air introduction system and the fuel introduction system outside of the primary combustion chamber may utilize the benefits of the recess and angled sides of the piston 531.

FIGS. 1-5E show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, a hybrid pre-chamber may comprise one or more openings for receiving air and fuel during a portion of an intake stroke. This may reduce cost and simplify packaging due to a single injector being positioned to inject directly into a primary combustion chamber while still providing fuel directly to an interior volume of the hybrid pre-chamber. Furthermore, by introducing air to the hybrid pre-chamber, residual gases may be purged from the interior volume of the pre-chamber. The technical effect of the hybrid pre-chamber is to enhance combustion properties via comprising one or more features for receiving air and fuel directly.

An embodiment of a system, comprises a pre-chamber fluidly coupled to a primary combustion chamber, the pre-chamber comprising a connecting passage fluidly coupling a fuel injector to the pre-chamber outside of the primary combustion chamber.

A first example of the system further includes where the pre-chamber further comprises an air passage arranged outside of the primary combustion chamber, the air passage fluidly coupling the pre-chamber to an intake passage.

A second example of the system, optionally including the first example, further includes where a check valve is arranged along the air passage.

A third example of the system, optionally including one or more of the previous examples, further includes where an ignition device is positioned to provide a spark within an interior volume of only the pre-chamber.

A fourth example of the system, optionally including one or more of the previous examples, further includes where the fuel injector is the only fuel injector, and wherein the fuel injector is positioned to inject fuel directly into the primary combustion chamber and the connecting passage.

A fifth example of the system, optionally including one or more of the previous examples, further includes where the pre-chamber comprises a plurality of openings fluidly coupling the pre-chamber to the primary combustion chamber.

An embodiment of an engine, comprises a pre-chamber fluidly coupled to a primary combustion chamber, wherein a piston is configured to oscillate within the primary combustion chamber, wherein the pre-chamber comprises an air passage fluidly coupling the pre-chamber to an intake passage, wherein the air passage is arranged outside of the primary combustion chamber.

A first example of the engine further includes where the air passage comprises a valve for adjusting a flow of intake air therethrough.

A second example of the engine, optionally including the first example, further includes where the pre-chamber further comprises a connecting passage configured to fluidly couple the pre-chamber to a fuel injector, wherein the connecting passage is arranged outside of the primary combustion chamber.

A third example of the engine, optionally including one or more of the previous examples, further includes where the connecting passage and the air passage are arranged above a fire deck in a cylinder head.

A fourth example of the engine, optionally including one or more of the previous examples, further includes where the connecting passage comprises a straight-hole shape, a cone shape, a symmetric venturi shape, or an asymmetric venturi shape.

A fifth example of the engine, optionally including one or more of the previous examples, further includes where the fuel injector is the only fuel injector, and wherein the fuel injector is positioned to inject directly into the primary combustion chamber and the connecting passage.

A sixth example of the engine, optionally including one or more of the previous examples, further includes where the piston is configured to adjust a volume of only the primary combustion chamber and not the pre-chamber.

A seventh example of the engine, optionally including one or more of the previous examples, further includes where the pre-chamber comprises a spark plug configured to provide a spark directly therein.

An eighth example of the engine, optionally including one or more of the previous examples, further includes where the pre-chamber comprises a plurality of lower openings fluidly coupling the pre-chamber to the primary combustion chamber, wherein the plurality of lower openings is angled relative to a central axis along with the piston oscillates.

An embodiment of a system, comprises a pre-chamber and a piston arranged within a primary combustion chamber, wherein the piston comprises a recess for receiving at least a portion of the pre-chamber.

A first example of the system further includes where the pre-chamber comprises a plurality of upper openings and a plurality of lower openings, wherein the plurality of upper openings is arranged outside of the recess when the portion of the pre-chamber is arranged in the recess.

A second example of the system, optionally including the first example, further includes where a fuel injector is configured to inject fuel directly into the primary combustion chamber toward the recess.

A third example of the system, optionally including one or more of the previous examples, further includes where the piston comprises a plurality of ramps sandwiching the recess, wherein the plurality of ramps is configured to direct gases toward openings of the pre-chamber.

A fourth example of the system, optionally including one or more of the previous examples, further includes where all openings of the pre-chamber are arranged within the primary combustion chamber.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a pre-chamber fluidly coupled to a primary combustion chamber, the pre-chamber comprising a connecting passage fluidly coupling a fuel injector to the pre-chamber outside of the primary combustion chamber, wherein the fuel injector is the only fuel injector and is positioned to inject fuel directly into the primary combustion chamber and the connecting passage.

2. The system of claim 1, wherein the pre-chamber further comprises an air passage arranged outside of the primary combustion chamber, the air passage fluidly coupling the pre-chamber to an intake passage.

3. The system of claim 2, further comprising a check valve arranged along the air passage.

4. The system of claim 1, wherein an ignition device is positioned to provide a spark within an interior volume of only the pre-chamber.

5. The system of claim 1, wherein the pre-chamber comprises a plurality of openings fluidly coupling the pre-chamber to the primary combustion chamber.

6. An engine, comprising:
a pre-chamber fluidly coupled to a primary combustion chamber, wherein a piston is configured to oscillate within the primary combustion chamber, wherein the pre-chamber comprises an air passage fluidly coupling the pre-chamber to an intake passage, wherein the air passage is arranged outside of the primary combustion chamber, and wherein the pre-chamber further comprises a connecting passage configured to couple the pre-chamber to a fuel injector positioned to inject directly into the primary combustion chamber and the connecting passage, wherein the fuel injector is the only fuel injector and where the connecting passage is arranged outside of the primary combustion chamber.

7. The engine of claim 6, wherein the air passage comprises a valve for adjusting a flow of intake air therethrough.

8. The engine of claim 6, wherein the connecting passage and the air passage are arranged above a fire deck in a cylinder head.

9. The engine of claim 6, wherein the connecting passage comprises a straight-hole shape, a cone shape, a symmetric venturi shape, or an asymmetric venturi shape.

10. The engine of claim 6, wherein the piston is configured to adjust a volume of only the primary combustion chamber and not the pre-chamber.

11. The engine of claim 6, wherein the pre-chamber comprises a spark plug configured to provide a spark directly therein.

12. The engine of claim 6, wherein the pre-chamber comprises a plurality of lower openings fluidly coupling the pre-chamber to the primary combustion chamber, wherein the plurality of lower openings is angled relative to a central axis along with the piston oscillates.

* * * * *